United States Patent Office 2,858,344
Patented Oct. 28, 1958

2,858,344

PREPARATION OF 1-ETHYNYLCYCLOHEXANOL

Roger F. Kleinschmidt and Sam H. Pitts, Jr., Bartlesville, Okla., assignors to Phillips Petroleum Company, a corporation of Delaware No Drawing. Application December 17, 1956
Serial No. 628,543

1 Claim. (Cl. 260—631)

This invention relates to an improved method for preparing acetylenic cyclohexanols. In one aspect it relates to a method wherein alkali metal alcoholates are used as condensation agents for the condensation of 1-alkynes with cyclohexanone or a methylcyclohexanone to form acetylenic cyclohexanols in good yield. In another aspect it relates to a condensation reaction which is specific to cyclohexanone and methylcyclohexanone for the formation of acetylenic alcohols.

Processes are known for the production of acetylenic alcohols using as condensation agents such materials as copper acetylide, alkali metal amides, alkali metal derivatives of mono-alkyl ethers or mono- or polyalkylene glycols, aqueous potassium hydroxide, and others. In those instances where alkali metal compounds have been utilized as condensing agents it generally has been customary to use potassium compounds because of their more powerful condensing action. Potassium compounds are more expensive than the corresponding sodium compounds and therefore a process where a sodium compound can be used as a condensing agent, to accomplish the beneficial effect usually attributed to potassium compounds, is indeed desirable. Acetylenic cyclohexanols are known in the prior art and are valuable starting materials in organic syntheses because of the functional alcohol and acetylenic groups. Thus, the acetylenic cyclohexanols and acetylenic methylcyclohexanols can be dehydrated, e. g., with phosphorus oxychloride to produce acetylenic cyclohexene or acetylenic methylcyclohexene which in turn can be reacted with a hydrogen halide to produce the corresponding haloalkenyl cycloalkenyl compounds. Low pressure hydrogenation of ethynyl cyclohexanol and ethynyl methylcyclohexanol produces vinyl cyclohexanol and vinyl methylcyclohexanol which are valuable monomers for polymerization reactions.

It is an object of this invention to provide an improved method for producing acetylenic alcohols. It is also an object of this invention to provide an improved method for condensing a 1-alkyne with a cyclohexanone utilizing a sodium alcoholate condensing agent. A further object of this invention is the provision of a simplified and economical method for preparing acetylenic cyclohexanols. Other objects and advantages will be apparent to those skilled in the art upon studying the following disclosure of this invention.

This invention contemplates reacting cyclohexanone or a methylcyclohexanone with a 1-alkyne in the presence of a sodium alcoholate condensing agent wherein the reactants are contacted in an inert diluent. The methylcyclohexanones which can be employed include 2-, 3-, or 4-methylcyclohexanone.

The sodium alcoholates or alkoxides include sodium methylate (sodium methoxide), sodium ethylate (sodium ethoxide), and the like. The lower molecular weight alcoholates containing up to about 5 carbon atoms are preferred because of their availability.

The 1-alkyne hydrocarbons which are applicable for condensation with the cyclohexanones include acetylene, methylacetylene, 1-butyne, 1-pentyne, and 3-methyl-1-butyne. Cyclohexanone condenses with acetylene to produce 1-ethynylcyclohexanol, with methylacetylene to produce 1-(1-propynyl)cyclohexanol, with 1-butyne to produce 1-(1-butynyl)cyclohexanol, with 1-pentyne to produce 1-(1-pentynyl)cyclohexanol, and with 3-methyl-1-butyne to produce 1-(3-methyl-1-butynyl)cyclohexanol. The 1-alkynes condense with methylcyclohexanone to produce the corresponding 1-alkynylmethylcyclohexanols, such as 1-ethynyl-3-methylcyclohexanol, 1-(1-propynyl)methylcyclohexanol, 1-(1-butynyl)methylcyclohexanol, 1-ethynyl-2-methylcyclohexanol, 1-ethynyl-4-methylcyclohexanol, etc.

The inert diluents which can be used are normally liquid materials which are preferably mutual solvents for the ketone and alkyne. Among those diluents which can be used are dioxane; the dialkyl ethers of mono- or polyalkylene glycols, such as ethylene glycol dibutyl ether (dibutyl carbitol); and those compounds containing the configuration

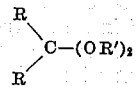

wherein R' is a hydrocarbon group containing only carbon and hydrogen and R is hydrogen or R' and wherein the total number of carbon atoms in the molecule are not more than 20, such as dimethoxymethane, diethoxymethane, 1,1-diethoxyethane, 1,1-dimethoxyethane. It is usually preferable to employ a diluent having a high solvent power for the alkyne, especially acetylene, and whose boiling point is appreciably higher or lower than the product, if the recovery of the product is to be done by distillation, so as to facilitate product isolation. The amount of diluent, when used, will usually be about 3 to 5 volumes per volume of the cyclohexanone. If a normally liquid 1-alkyne is employed for condensation with the cyclohexanone, it will not always be necessary to utilize an inert diluent. For example, an excess of liquid alkyne can function as the solvent or diluent.

The reaction can be conducted at temperatures in the range —20 to 120° C., but is preferably conducted at temperatures within the range 0 to 45° C. The reaction can be accomplished at room temperature; however, the reaction is exothermic and therefore the temperature will usually rise above the starting temperature so that in some instances it may be desirable to remove some of the heat of reaction by some cooling means such as cooling coils in or around the reactor. The reaction pressure will be maintained in the range of 50 to 500 p. s. i. g., or higher when the alkyne is normally gaseous at the reaction temperature. When an alkylne is used which is normally liquid at the reaction temperature, the pressure can be atmospheric or less. Thus, the reaction pressure can be from sub-atmospheric to 500 p. s. i. g., or higher. The pressure should be such that the reaction mixture is maintained substantially in the liquid phase. The advantages of this invention are obtained by maintaining a relatively high concentration of alkyne in the liquid reaction mixture. It is preferable that an excess of alkyne be present in the liquid reaction mixture and therefore it will often be desirable to recover the unreacted alkyne by suitable means. For example, the normally gaseous alkynes can be vented to a low pressure storage vessel. Normally liquid alkynes can be separated, for example, by distillation, solvent extraction or other known separation methods.

The amount of condensing agent will be in the range of 1 to 3 mols per mol of cyclohexanone or methylcyclohexanone. The reaction time is generally in the range of 30 minutes to 5 hours and a reaction time of 2 to 3 hours is generally sufficient. The reaction time can be decreased by removing the heat of reaction so that the cyclohexanone can be introduced at an increased rate. Means for providing adequate mixing is also desirable when a shortened reaction time is to be achieved.

One method of effecting the reaction is to charge a suitable solvent and the alcoholate to a suitable reactor equipped with means for agitating the contents, means for determining and controlling temperature and pressure and suitable inlets and outlets. After suitable purge of the reactor for the removal of air, the 1-alkyne is charged to the reactor under conditions of agitation to provide intimate contact of the 1-alkyne with the liquid solution in the reactor. When using a gaseous alkyne, such as acetylene, the alkyne can be continuously or intermittently absorbed in the solvent up to the maximum amount possible at the desired reaction conditions. Since an excess of 1-alkyne is generally used, the 1-alkyne feed supply to the reactor can be maintained after the solvent has dissolved as much 1-alkyne as possible in order that the solvent and reactor free space remain saturated throughout the reaction. After the absorption of acetylene by the solvent is complete, the reactor temperature is adjusted to the desired operating level and the cyclohexanone is introduced into the reactor. If desired, the cyclohexanone can be added in one portion after the condensing agent-solvent mixture has been saturated with 1-alkyne.

After completion of the desired reaction, the reaction mixture is hydrolyzed with water. It is necessary to add sufficient water to convert the sodium derivative or intermediate to the free cyclohexanol. At least one mol of water per mol of sodium derivative is therefore necessary and it is desirable to add an excess of approximately 2 or 3 mols or more of water per mol of sodium salt in order to obtain a rapid and complete hydrolysis. Since a certain amount of product may be lost by entrainment or solution in the aqueous phase, it is not desirable to use exceptionally large amounts of water in this step of the process. The oil layer is separated from the aqueous layer following the hydrolysis step by a suitable means such as decantation or the like. The oil layer is neutralized with an acid such as sulfuric acid, acetic acid, solid carbon dioxide, and the like, in order to neutralize any residual base which may be entrained and/or dissolved in the oil layer. The crude product is then dried by suitable means, such as distillation or the use of a desiccant such as anhydrous magnesium sulphate, and is then purified by suitable method, such as vacuum distillation, extraction, etc.

It is not necessary to employ pure alkynes in this invention. Under some conditions the 1-alkyne advantageously can be diluted with an inert gas, such as nitrogen and this greatly reduces the explosion hazard, particularly when conducting the reaction under the higher super-atmospheric pressures. The alkyne can also be diluted with other hydrocarbons such as olefins, diolefins, paraffins and cycloparaffins. Thus, the effluent gas from a butane cracking operation containing acetylene, methylacetylene, butenes, and paraffins together with hydrogen and small amounts of other gases advantageously can be introduced into a reactor containing sodium alcoholate and a solution of cyclohexanone in an inert diluent. The acetylenes will be converted into corresponding acetylenic cyclohexanols so that a hydrocarbon stream can be purified by removal of the small amounts of acetylenic contaminants and at the same time a valuable product will be obtained.

The process can be practiced as a batch process or it can be made continuous without departing from the inventive concept as herein disclosed. If the process is to be a continuous one, the diluent, sodium alcoholate, cyclohexanone, and the acetylene will all be continuously introduced into the reactor and the reaction mixture will be continuously recovered therefrom.

The following examples are illustrative of the invention but are not to be construed as limiting the invention.

Example I

Five hundred milliliters of dibutyl carbitol and 108 grams of sodium methylate were added to a standard 1-liter, high pressure autoclave equipped with a stirrer. The reactor was purged with nitrogen and acetylene was continuously absorbed over a period of about 1 hour at 200 p. s. i. g. and room temperature until saturation was achieved. One mol (98 grams) of cyclohexanone was then added to the reactor over a period of 1 hour and 9 minutes. Stirring was continued, at 200 p. s. i. g., for an additional 2 hours and 20 minutes. The reaction temperature was in the range 33–38° C. as measured by a thermocouple housed in a thermowell within the reactor. There was no attempt to control the reaction temperature by external means. The reaction pressure of 200 p. s. i. g. was maintained by continuous addition of acetylene to the reactor. The pressure was released, the autoclave was dismantled and the semi-solid mixture was treated with water to hydrolyze the product. The resultant two-phase mixture was separated into an oily phase and an aqueous phase. The aqueous phase was extracted with ether and the extract was added to the oily phase. The oily phase was neutralized with solid carbon dioxide, dried with anhydrous magnesium sulfate and distilled at 15 mm. of mercury pressure. A yield of 75 weight percent of 1-ethynylcyclohexanol, based upon the cyclohexanone charged, was obtained. The alkynol thus formed was a crystalline, white solid melting at 30 to 32° C. and had a boiling point of 80 to 83° C. at 15 to 16 mm. mercury pressure. These values compared favorably with a boiling point of 66° C. at 8 mm. and a melting point of 30 to 31° C. reported in Chemical Abstracts, vol. 46, pp. 7036–7 (1952).

A comparable yield of 1-ethynyl-3-methylcyclohexanol is obtained when 3-methylcyclohexanone is utilized instead of cyclohexanone.

Example II

To a reactor there was added 700 ml. of diethyl ether and 54 gm. of sodium methylate. The contents of the flask where then cooled to −10° C., in a Dry Ice-acetone bath, and acetylene was bubbled through the liquid for 1 hour and 17 minutes at atmospheric pressure. The temperature was measured by a thermometer in the reaction flask. One mol (98 gm.) of cyclohexanone was then added slowly, by means of a dropping funnel, over a period of 2 hours and 34 minutes with continuous injection of acetylene during this time. The product was recovered as in Example I with a yield of 11.4 weight percent of 1-ethynylcyclohexanol, based on the cyclohexanone charged.

Example III

Five hundred milliliters of dibutyl carbitol and 108 grams of sodium methylate were charged to the autoclave of Example I. Acetylene was charged in increments as follows: The autoclave was pressured without agitation with pure acetylene at about 200 p. s. i. g. at room temperature. The acetylene line valve was closed and agitation was begun, resulting in a rapid drop in pressure as the acetylene dissolved. When the rate of decrease in pressure became negligible, the agitation was stopped, the drop in pressure was noted, and the operation was repeated until no further pressure drop occurred over a 10-minute period. From a summation of the incremental pressure drops an absorption of 21.7 grams of acetylene was calculated.

The acetylene valve was closed and one mol (84 grams) of cyclopentanone was charged gradually over a period of one hour with agitation. The reaction mixture was stirred for an additional 17.3 hours at room temperature. No pressure drop was observed nor change from ambient temperature. The creamy brown reaction mixture was hydrolyzed with water and the oil layer was separated and acidified with sulfuric acid. Subsequent treatment of the reaction product was the same as in Example I. Only a trace of cycloalkynol was obtained.

*Example IV*

This preparation was made following the procedure of Example III, except that methyl isobutyl ketone was employed with the dibutyl carbitol, sodium methylate and acetylene. The ketone addition required 2 hours and the reaction temperature was in the range 33-38° C. The run was interrupted at this point by a power failure which lasted 1½ hours. When power returned, the reaction mixture was agitated another 10 minutes. Only a trace amount of product was detected in the reactor effluent. The power failure did not have any adverse effects on the yield, since the two hours reaction time prior to the power failure was sufficient time to make the product.

The results of the Examples show that excellent yields are obtained by the practice of the process of this invention, exemplified by Example I, as compared to the process of Example II. Examples show that the reaction does not proceed when ketones other than cyclohexanone or methylcyclohexanones are used.

Reasonable variations and modifications are possible within the scope of the disclosure of the present invention, the essence of which is the discovery of an improved condensation reaction, specific to 1-alkynes and cyclohexanone or a methylcyclohexanone, to produce 1-alkynyl cyclohexanols wherein a sodium alcoholate is used as the condensing agent in a suitable diluent and at pressures sufficient to maintain a relatively high concentration of 1-alkyne in the liquid reaction mixture.

That which is claimed is:

An improved process for preparing 1-ethynylcyclohexanol which comprises suspending sodium methylate in about 5 volumes per volume of cyclohexanone, to be added later, of dibutyl carbitol; saturating the resulting suspension with acetylene in a reaction zone at about 200 p. s. i. g. and at room temperature; adding cyclohexanone to said reaction zone in an amount of 0.33 to 1 weight mol of cyclohexanone per 1 weight mol of sodium methylate during a period of about 1 hour; agitating the mixture in the reaction zone for an additional period of about 2½ hours; maintaining the reaction zone pressure at about 200 p. s. i. g. by addition of acetylene; releasing the pressure in the reaction zone; hydrolyzing the reaction product with water; and recovering 1-ethynylcyclohexanol from the reaction mixture.

References Cited in the file of this patent

FOREIGN PATENTS 589,350    Great Britain _____ June 18, 1947